E. G. & A. D. ROWELL, J. R. RICE & S. M. SEELEY.
SHOVEL PLOW AND CULTIVATOR
No. 108,834. Patented Nov. 1, 1870.
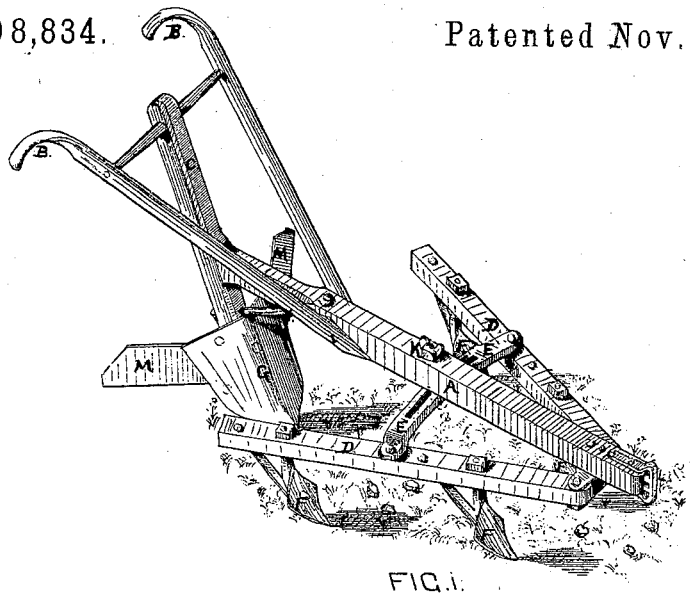
FIG. I.
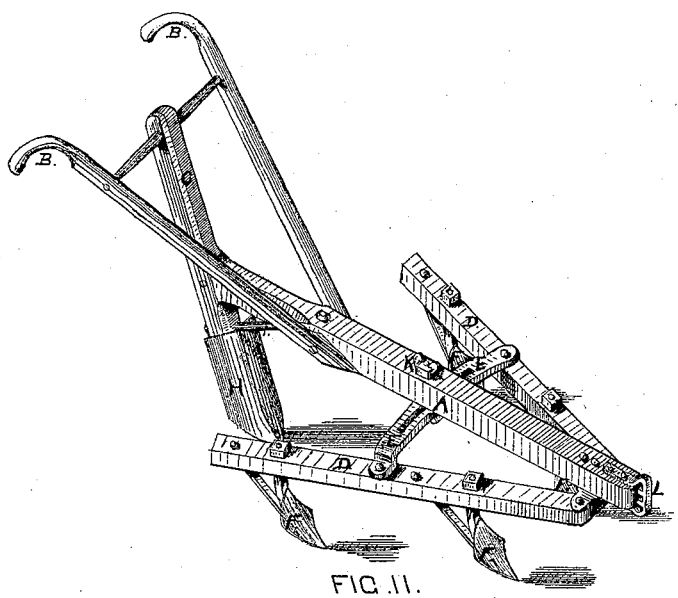
FIG. II.

United States Patent Office.

ELIJAH G. ROWELL, ALFONZO D. ROWELL, JAMES R. RICE, AND SMITH M. SEELEY, OF HARTFORD, WISCONSIN.

Letters Patent No. 108,834, dated November 1, 1870.

IMPROVEMENT IN SHOVEL-PLOWS AND CULTIVATORS.

The Schedule referred to in these Letters Patent and making part of the same.

We, ELIJAH G. ROWELL, ALFONZO D. ROWELL, JAMES R. RICE, and SMITH M. SEELEY, of Hartford, in the county of Washington and State of Wisconsin, have invented certain Improvements in Shovel-Plows and Cultivators, of which the following is a specification.

Nature and Object of the Invention.

The nature of our invention is to place two or more cultivator-teeth in advance of a shovel-plow, to stir up the earth in advance of the plow and pulverize it, and also to change the plow by taking off the plow-share and supplying a cultivator-tooth and making the invention a five-tooth cultivator, with the single tooth behind; and, also, take off the wings from the plow when it is wanted for use without them, or take off the cultivator-teeth and leave a shovel-plow alone.

Description of the Accompanying Drawing forming part of this Specification.

Figure I is a perspective view of the plow and cultivator together, and

Figure II is a view of same with the plow removed and a cultivator-tooth in place of the plow-share.

General Description.

A is the plow-beam
B B, the handles.
C, the standard, to which the plow-share is attached.
D D, the cultivator-frame attached to the plow-beam, and to which the cultivator-teeth are attached.
E E, the cross-bars, attached to the plow-beam and to the frames D D.
F F F F, cultivator-teeth.
G, shovel plow-share.
H, extra cultivator-tooth.
I, bolt from beam A to standard C, holding the two together
K, nut on the head of a bolt which passes through beam A and cross-bars E E, to regulate the distance that the frame D D may be apart.
L, draft-iron on the end of beam A.
M M, wings on shovel plow-share, to widen out the share for hilling up corn, or similar purposes.

This plow and cultivator may be used as shown in fig. 1, or the wings may be taken from the shovel plow-share, and it can be used without the wings, regulating the frames D D wider or narrower, or it may be used as a cultivator alone, as shown in fig. II, or the frames D D may be taken off, and it may be used as a shovel-plow alone.

Claim.

We claim as our invention,
A shovel-plow and cultivator, constructed with center frame A, handles B B, stem-post C, side frames D D, cross-bars E, teeth F, and plow-share G, arranged substantially as described.

ELIJAH G. ROWELL.
ALFONZO D. ROWELL.
JAMES R. RICE.
SMITH M. SEELEY.

Witnesses:
CHARLES H. SMITH,
H. W. SAWYER.